No. 838,412. PATENTED DEC. 11, 1906.
S. B. HORNIDGE.
APPARATUS FOR TREATING FEATHERS.
APPLICATION FILED MAR. 21, 1906.

2 SHEETS—SHEET 1.

Witnesses:
James T. Duhamel
Alice McCabe

Inventor:
Samuel B. Hornidge,
By Victor J. Evans
Attorney.

No. 838,412. PATENTED DEC. 11, 1906.
S. B. HORNIDGE.
APPARATUS FOR TREATING FEATHERS.
APPLICATION FILED MAR. 21, 1906.
2 SHEETS—SHEET 2.
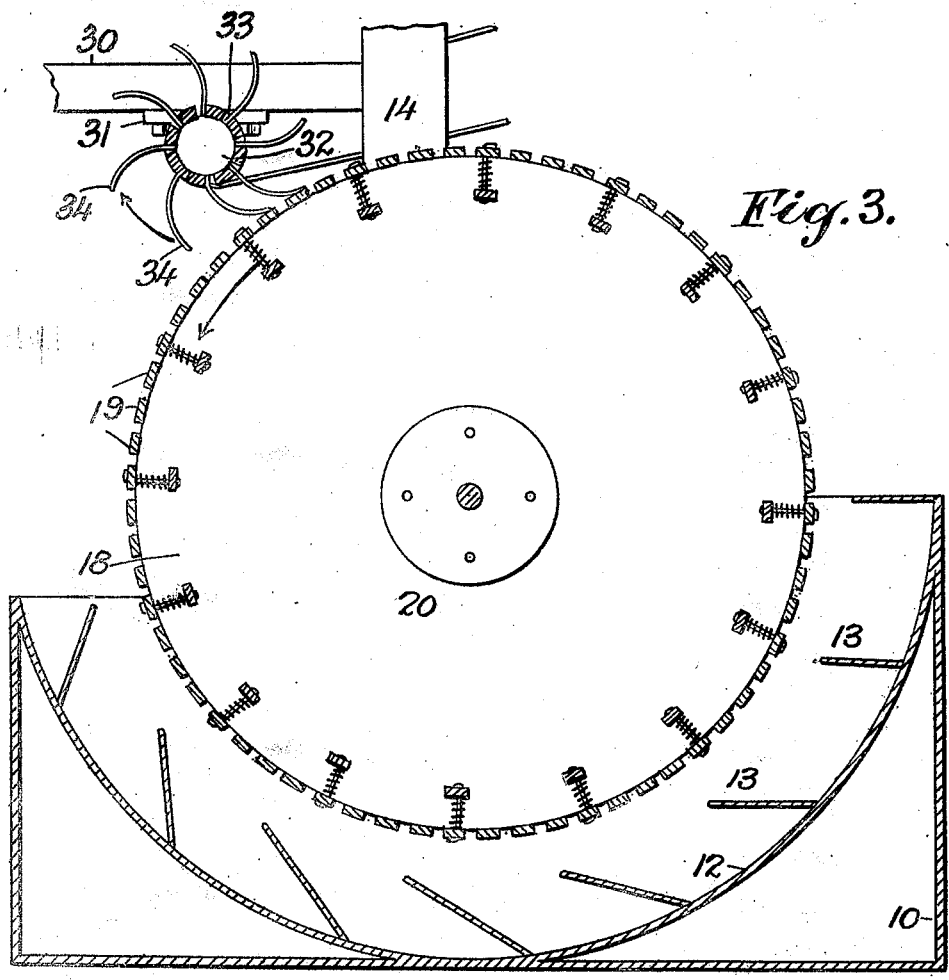
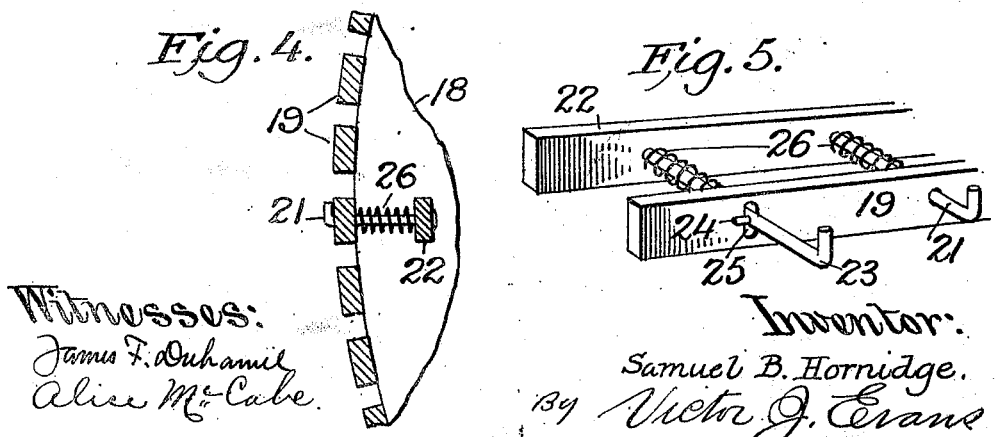
Witnesses:
James F. Duhamel
Alice McCabe
Inventor:
Samuel B. Hornidge.
By Victor J. Evans
Attorney.

UNITED STATES PATENT OFFICE.

SAMUEL B. HORNIDGE, OF BROOKLYN, NEW YORK.

APPARATUS FOR TREATING FEATHERS.

No. 838,412.    Specification of Letters Patent.    Patented Dec. 11, 1906.

Application filed March 21, 1906. Serial No. 307,262.

*To all whom it may concern:*

Be it known that I, SAMUEL B. HORNIDGE, a citizen of the United States, residing at Brooklyn, in the county of Kings and State of New York, have invented new and useful Improvements in Apparatus for Treating Feathers, of which the following is a specification.

My invention relates to machines for treating feathers, and more particularly to machines which are adapted to dry and beat feathers which have been wet or dampened in certain processes, such as cleaning, dyeing, &c. These and other objects of this invention are described in detail in the following specification and set forth in the appended claims.

Figure 1:
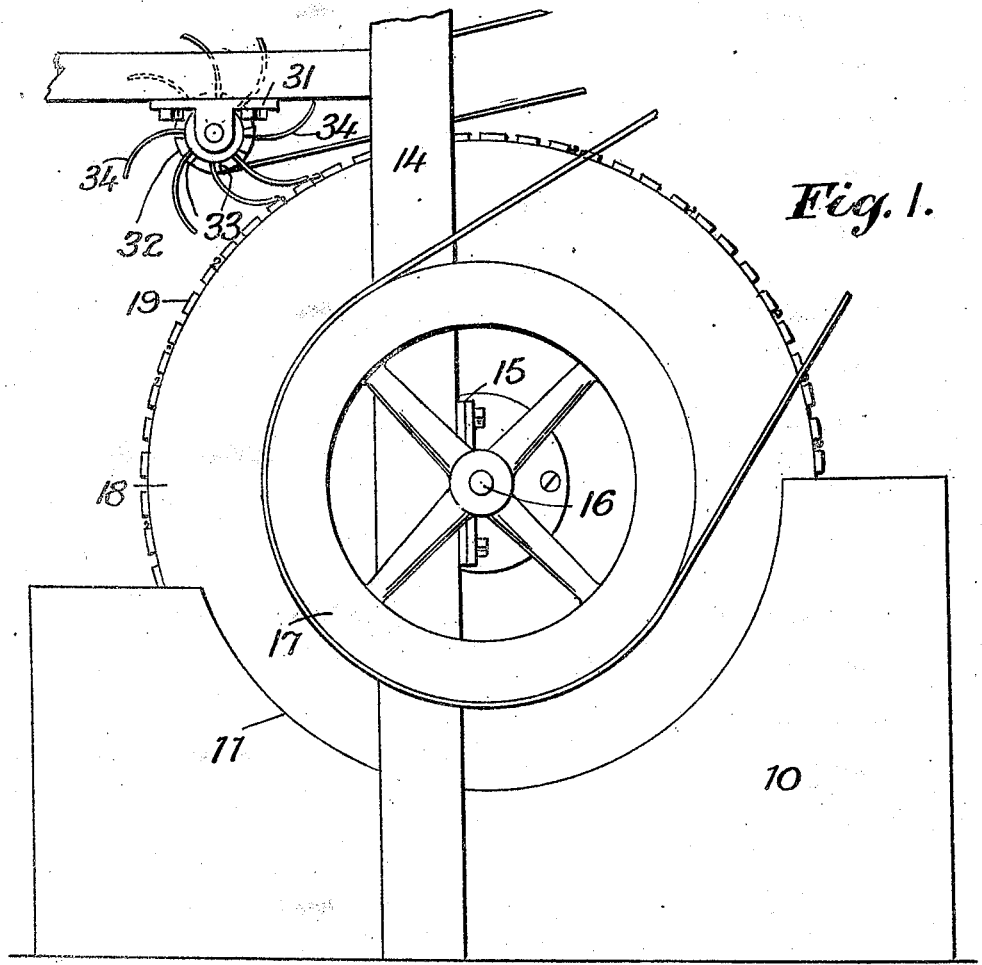
Figure 2:
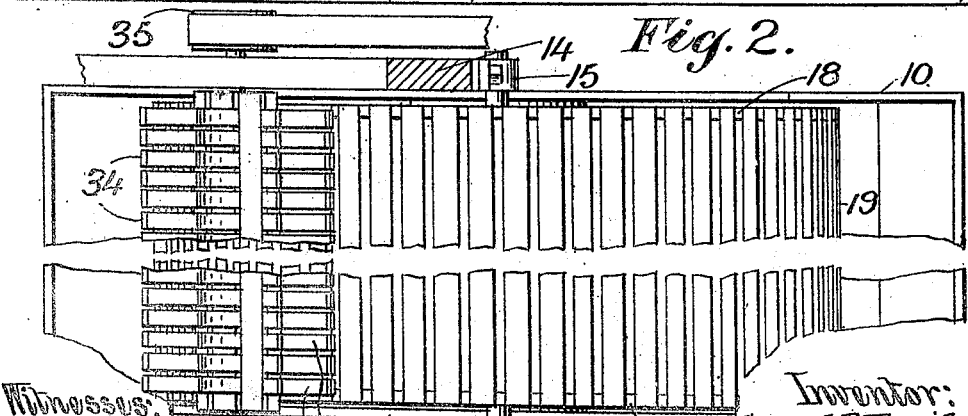

In the accompanying drawings, forming a part of this application, Figure 1 is a side elevation of the apparatus. Fig. 2 is a plan view. Fig. 3 is a vertical sectional view. Figs. 4 and 5 are detail views which will be referred to hereinafter.

The apparatus is partly contained in a box 10 of any desired height and having its sides cut away in a semicircular shape, as at 11. The interior of this box, as shown in Fig. 3, has a semicylindrical wall 12, with tangential blades 13 running from side to side of the box and of such width as may be found desirable, or these blades may be built so as to be adjustable to slide any distance away from the wall.

The outside walls of the box carry uprights 14, which have journal-boxes 15, in which is journaled a shaft 16, provided with a pulley 17 or any other desired driving means, and secured to this shaft is a drum 18, made up of two sides, which are united by a number of slats 19 a short distance apart, giving the light and air access to the interior of the drum, at the same time lightening its construction. The heads 18 of the drum are secured to the shaft by means of disks 20, and the shaft, while occupied in the central point of the drum, is also the center of the semicylindrical wall 12, so that this wall and the drum are arranged concentrically. It is intended to arrange the feathers to be treated around this slatted cylinder after securing strings to the stems of the feathers, and these strings are then caught by hooks 21 and held against the slats while the drum revolves. These hooks are arranged in series, of which each is mounted on each fourth slat.

I do not wish it to be understood that I limit myself to mounting each series of hooks on each fourth slat, as each series may be placed at a greater or lesser distance apart.
Each hook is provided with a shank portion 23, movably disposed in openings in the slats 19. Each series of hooks has secured to the inner ends of their shank portions 23 a bar 22. Mounted upon the shank portions 23 of the hooks and interposed between the slats 19 and bars 22 are expansion-springs 26, said springs retaining the hooks 21 in engagement with the outer surfaces of the slats 19, whereby when the spring has been inserted between the slat and hook it is clamped in position against accidental withdrawal. It is desired to retain the hooks 21 spaced from the outer surfaces of the slats 19, so that the feathers may be applied and removed, and to accomplish this each end hook of each series has its shank portion 23 provided with a laterally-extending pin 24, and each end hook is movably disposed in an elongated opening 25 in the slats 19. These end hooks are also movably connected to the bars 22, so that the pins 24 may be after they have been drawn through the openings 25 turned so as to engage the outer surface of the slats 19 upon the inward movement of the shank portions 23 caused by the expansion of the springs 26.

It is obvious that other attaching means may be used for these strings, such as hooks on the sides of the slats or any other means which may be found desirable.

The uprights 14 carry horizontal arms 30 with journal-boxes 31, in which is journaled the shaft of a small drum 32, having longitudinal slots 33, to one side wall of each being secured each of the flails 34, made of leather or similar flexible material, the outer edges of said flails being adapted to beat the outer surface of the slats of the drum. This drum 32 is driven by any suitable means through the pulley 35, and its rotation is about six or eight times that of the drum, so that when the feathers are strung upon the drum, as above described, and the two drums rotated in the direction shown by the arrows the flails 34 not only fan, but beat the feathers and tend to relieve them of the moisture they contain. As the drum rotates the feathers along the lower edge strike the tangential partitions 15 and are held against the surface of the drum and not permitted to fly away from the drum. The drum being open and permitting the free circulation of the air permits the feathers to be subjected to this free circulation, so that the moisture is very quickly removed.

It is obvious that various modifications may be resorted to in the construction of this drying apparatus without departing from the essential features above described and shown, and I do not confine myself to the use of this apparatus for the treating of large feathers, such as ostrich feathers and plumes, but may use the same for drying numerous small articles and fabrics, which could be held thereby and quickly treated.

Having thus described the invention, what is claimed as new is—

1. A drying apparatus comprising a drum, a hook, and a spring means mounted upon the hook for retaining the same in engagement with the drum.

2. A drying apparatus comprising a drum, hooks carried by the drum, a bar secured to said hooks, and means for retaining the hooks in engagement with the drum.

3. A drying apparatus comprising a drum, hooks, a bar carried by the hooks, and spring means interposed between the drum and bar for retaining the hooks in engagement with the drum.

4. A drying apparatus comprising a drum, a hook, means by which the hook may be retained in engagement with the drum, and means by which said hook may be retained spaced from the drum.

5. A drying apparatus comprising a drum, a hook, means for retaining the hook in engagement with the drum, and means by which the hook may be retained spaced from the drum.

6. A drying apparatus comprising a drum, hooks, a bar carried by said hooks, means for retaining the hooks in engagement with the drum, and means carried by one of said hooks by which the hooks may be retained spaced from the drum.

7. A drying apparatus comprising a drum, hooks carried by the drum, a bar carried by the hooks, means interposed between the bar and drum for retaining the hooks in engagement with the drum, and means by which the hooks may be retained spaced from the drum.

8. A drying and beating apparatus comprising a slotted drum, means carried by the drum for attaching an article thereto, and a flail supported to coöperate with the drum to act upon the article carried thereby.

9. A drying and beating apparatus comprising a receptacle, a blade arranged within said receptacle, a slotted drum, and a flail supported to coöperate with the drum to act upon the article carried thereby.

10. A drying and beating apparatus comprising a receptacle, a blade arranged within said receptacle, a slotted drum, means carried by the drum for attaching an article thereto, and a flail supported to coöperate with the drum to act upon the article carried thereby.

In testimony whereof I affix my signature in presence of two witnesses.

SAMUEL B. HORNIDGE.

Witnesses:
 H. G. HOSE,
 JAMES F. DUHAMEL.